US012682449B2

(12) United States Patent
Sacco et al.

(10) Patent No.: US 12,682,449 B2
(45) Date of Patent: Jul. 14, 2026

(54) AUTOMATED DEFECT RECOGNITION AND DETERMINATIONS OF PORE CLUSTER COMPLIANCE

(71) Applicant: Relativity Space, Inc., Long Beach, CA (US)

(72) Inventors: Christopher Sacco, Long Beach, CA (US); Viraj Sinha, Long Beach, CA (US); Kyle Buzza, Long Beach, CA (US); Salik Syed, Long Beach, CA (US); Andrew Taormina, Long Beach, CA (US); Bryson Jones, Long Beach, CA (US); Cem Tutum, Long Beach, CA (US); Jeffrey Rossin, Long Beach, CA (US)

(73) Assignee: Relativity Space, Inc., Long Beach, CA (US)

( * ) Notice: Subject to any disclaimer, the term of this patent is extended or adjusted under 35 U.S.C. 154(b) by 0 days.

(21) Appl. No.: 18/929,462

(22) Filed: Oct. 28, 2024

(65) Prior Publication Data

US 2026/0051043 A1     Feb. 19, 2026

Related U.S. Application Data

(60) Provisional application No. 63/593,927, filed on Oct. 27, 2023.

(51) Int. Cl.
*G06T 7/00* (2017.01)
*G06T 7/11* (2017.01)
(Continued)

(52) U.S. Cl.
CPC ............... *G06T 7/001* (2013.01); *G06T 7/11* (2017.01); *G06T 7/62* (2017.01); *G06T 7/64* (2017.01);
(Continued)

(58) Field of Classification Search
CPC .. G06T 7/001; G06T 7/64; G06T 7/62; G06T 7/11; G06T 2207/10116;
(Continued)

(56) References Cited

U.S. PATENT DOCUMENTS

2024/0351222 A1* 10/2024 Schorr .................... B25J 15/08

FOREIGN PATENT DOCUMENTS

CN          115345837 A  * 11/2022   ............... G06T 7/12

OTHER PUBLICATIONS

Zheng et al., "Wire Arc Additive Manufacturing Microstructure Pore Defect Detection Algorithm Based on Improved YOLOv5", 2023, 2023 4th International Conference on Big Data, Artificial Intelligence and Internet of Things Engineering (ICBAIE), pp. 102-106 ( Year: 2023).*

(Continued)

*Primary Examiner* — David F Dunphy
(74) *Attorney, Agent, or Firm* — KPPB LLP

(57) ABSTRACT

A process can obtain a RT image of an article from the RT imaging system, the article comprising a reference feature, identify a first portion and a second portion of the first RT image, wherein the first portion and the second portion overlap, and classify each pixel in the first portion and the second portion using a pore classification model. A pore map can then be generated and mapped onto the article based on data received from the at least one sensor. A process can identify rejected regions on the pore map, wherein the rejected regions exceed a rejection threshold based on predefined rules. These rejected regions can then be displayed.

10 Claims, 6 Drawing Sheets

(51) Int. Cl.
   *G06T 7/62*      (2017.01)
   *G06T 7/64*      (2017.01)
   *G06V 10/26*     (2022.01)
   *G06V 10/32*     (2022.01)
   *G06V 10/762*    (2022.01)
   *G06V 10/764*    (2022.01)
   *G06V 10/82*     (2022.01)
(52) U.S. Cl.
   CPC .............. *G06V 10/26* (2022.01); *G06V 10/32* (2022.01); *G06V 10/762* (2022.01); *G06V 10/764* (2022.01); *G06V 10/82* (2022.01); *G06T 2207/10116* (2013.01); *G06T 2207/20081* (2013.01); *G06T 2207/20084* (2013.01); *G06T 2207/20092* (2013.01); *G06T 2207/30136* (2013.01)
(58) Field of Classification Search
   CPC . G06T 2207/20081; G06T 2207/20084; G06T 2207/20092; G06T 2207/30136; G06V 10/762; G06V 10/32; G06V 10/82; G06V 10/26; G06V 10/764
   See application file for complete search history.

(56)                References Cited

OTHER PUBLICATIONS

Snell et al., "Methods for Rapid Pore Classification in Metal Additive Manufacturing", 2019, JOM, vol. 72, No. 1, pp. 101-109 (Year: 2019).*

* cited by examiner

AUTOMATED DEFECT RECOGNITION AND DETERMINATIONS OF PORE CLUSTER COMPLIANCE

CROSS-REFERENCE TO RELATED APPLICATIONS

The current application claims priority under 35 U.S.C. 119 (e) to U.S. Provisional Patent Application Ser. No. 63/593,927, entitled "Automated Defect Recognition and Determinations of Pore Cluster Compliance", filed Oct. 27, 2023. The disclosure of U.S. Provisional Patent Application Ser. No. 63/593,927 is hereby incorporated by reference in its entirety for all purposes.

FIELD OF THE INVENTION

The present invention generally relates to additive manufacturing systems. In particular, it relates to defect detection in articles manufactured using additive manufacturing techniques.

BACKGROUND

Additive manufacturing is a process by which a product or article is manufactured by adding one layer of material on top of another in a sequence or pattern that results in a solid article being built. This method of manufacturing is commonly referred to as three dimensional or 3-D printing and can be done with different materials, including plastic and metal. Wire arc additive manufacturing (WAAM) is a production process used to 3D print and/or repair metal parts using a metal wire feedstock and an electric arc as an energy source.

WAAM typically involves using an energy source to create a weld pool and feeding a metal wire (feed material) into the weld pool by way of a printing head or printing head nozzle. Energy (namely, an electric current carried by the feed wire) is used to create the weld pool. The printing head, and subsequently the weld pool can be moved. As the printing head and the welding pool moves, the trailing edge of the pool cools and solidifies. Through this process of gradually moving the printing head along a path can lead to a fully printed part.

The process by which material is deposited can be controlled by the use of shielding gas around the feeding material. The shielding gas can help to make a better weld pool for an overall better part. The shielding gas can protect the weld pool from corrosive gases and moisture.

SUMMARY OF THE INVENTION

In many embodiments of the invention, a robotic additive manufacturing inspection system is configured to identify porosity defects in manufactured articles, the robotic additive manufacturing inspection system including an additive manufacturing robot, the additive manufacturing robot including a robotic arm, a radiographic testing (RT) imaging system mounted to the robotic arm, and at least one sensor capable of determining a position of the robotic arm, an image processing system, the image processing system configured to obtain a RT image from the RT imaging system of an article created by additive manufacturing and localization information including the position of the robotic arm when the RT image was captured, adjust brightness values of pixels within the RT image to normalize the values against brightness values in a reference image, identify a plurality of image portions within the RT image, wherein each image portion at least partially overlaps at least one other image portion, classify each pixel in each image portion using a pore classification binary segmentation model as "pore" or "not pore", generate a pore map based on applying one or more porosity detection clustering filters to the classification of the pixels in the image portions, where the pore map includes identification of pores within the image portions and measurements of the pores based on a measurement calibration of the RT imaging system, and determine whether to identify at least one area within the RT image as a rejected region based upon the pore map, when the area exceeds a rejection threshold based on a set of predetermined criteria.

In another embodiment of the invention, the image processing system is further configured to display the pore map with the rejected regions visually identified.

In some embodiments of the invention, the image processing system is further configured to receive an annotation from a user, wherein the annotation is characterized by at least a location on the pore map, and update the pore classification binary segmentation model based on the received annotation.

In several embodiments of the invention, the annotation comprises at least one transformation selected from a list of adjustments to contrast/brightness, zoom in, circling out of blotches, circling out of defects, use of rulers to measure distances, text notations, and pore classifications.

In more embodiments of the invention, the robotic additive manufacturing inspection system includes a laser projection system configured to project indicators at locations of defects based upon the pore map and the localization information.

In still more embodiments of the invention, the image processing system is further configured to estimate a physical property related to integrity of the article based upon the pore map and a finite element model (FEM).

In still further embodiments of the invention, the article is created by Wire Arc Additive Manufacturing (WAAM).

In yet another embodiment of the invention, adjusting the brightness values of pixels within the RT image to normalize the values against the brightness values in a reference image includes setting the brightness values so that a histogram of the RT image approximately matches a histogram of the reference image.

In further embodiments of the invention, the pore classification binary segmentation model is implemented on a U-Net architecture.

In another embodiment of the invention, porosity detection is performed only on groups of three or more pixels.

In some embodiments of the invention, porosity detection utilizes a cluster detector.

In several embodiments of the invention, porosity detection evaluates characteristics of each pore in the pore map including convexity, circularity, and a minimum size.

In additional embodiments of the invention, the porosity detection provides a center point and radius of each detected pore in the pore map.

In more embodiments of the invention, the plurality of image portions within the RT image collectively include all the pixels of the RT image at least once.

In still more embodiments of the invention, the rejection threshold based on a set of predetermined criteria includes spacing, size, and frequency between defects in the pore map.

In yet another embodiment of the invention, the predetermined criteria includes metrics of spacing, size, and frequency of pores.

In further embodiments of the invention, generate a pore map further includes resolving classification of pixels as "pore" or "not pore" that differ in image portions where the pixel is included in overlapping areas by classifying the pixel as "not pore."

In another embodiment of the invention, generate a pore map further includes resolving classification of pixels as "pore" or "not pore" that differ in image portions where the pixel is included in overlapping areas by taking the identification having the highest confidence value output by the pore classification binary segmentation model.

In some embodiments of the invention, the article comprises a reference feature and the image processing system is further configured to obtain the measurement calibration of the RT imaging system based on the reference feature.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
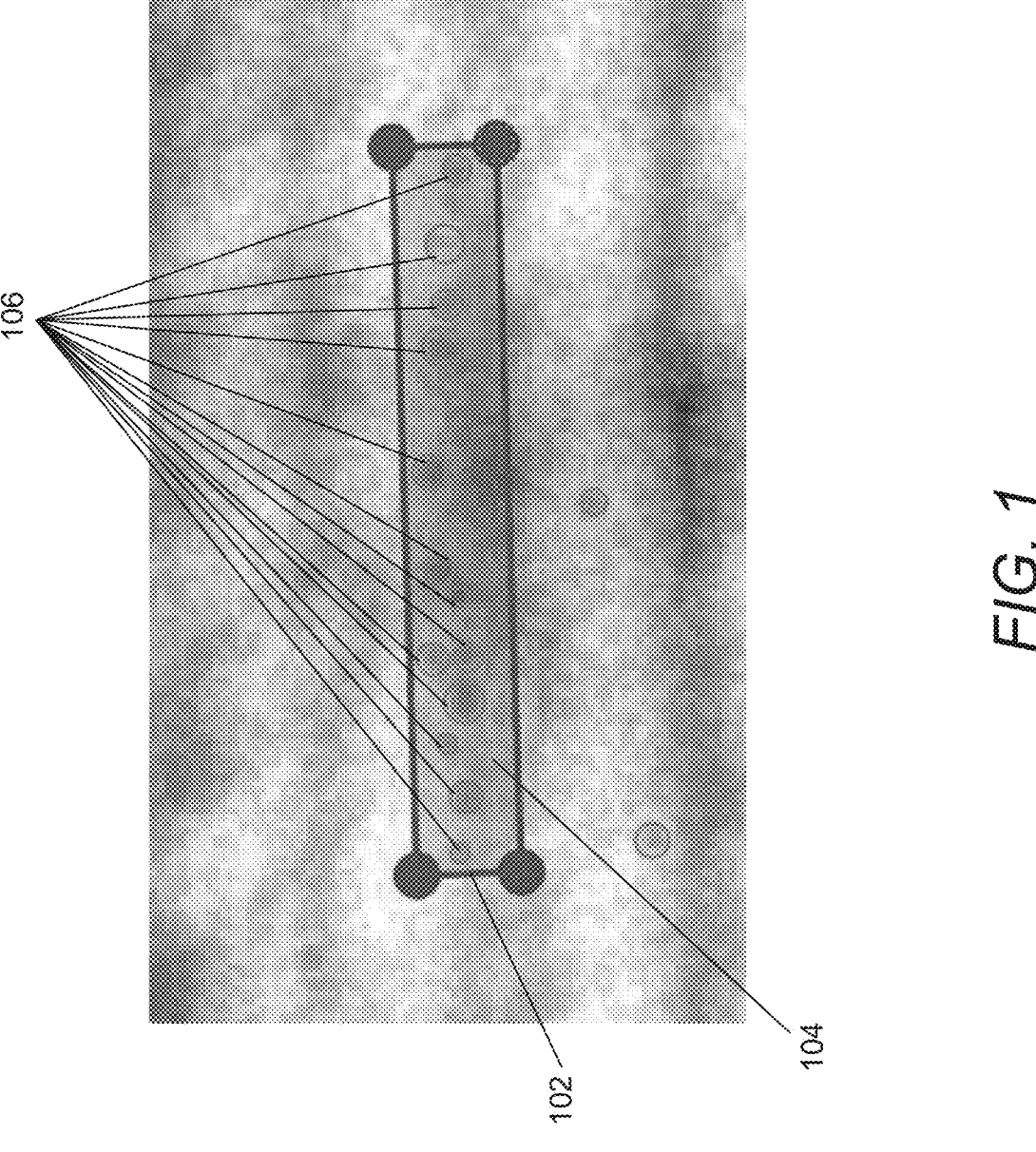
FIG. 1 illustrates an example radiographic testing (RT) image of an article with porosity in accordance with embodiments of the invention.

Turning now to the drawings, systems and methods for performing defect detection in products formed by additive manufacturing using active learning in accordance with various embodiments of the invention are illustrated. Additive manufacturing techniques, such as (but not limited to) Wire Arc Additive Manufacturing (WAAM), can have various complications not present in traditional manufacturing processes. For example, there are many parameters that are involved in WAAM. Computer control of various parameters automatically with minimal or zero human intervention can improve WAAM manufacturing processes. However, incorrect or suboptimal selection of the parameters controlling a WAAM manufacturing process can result in undesirable porosity that can compromise manufactured articles. Accordingly, systems and methods in accordance with many embodiments of the invention perform automatic defect detection in articles manufactured by WAAM.

Porosity can represent a significant risk to the structure of an article, because porosity can degrade maximum strength and contribute to crack propagation at places of severe porosity. Still, many examples exist of parts that remain useable despite porosity.

Detection and measurement of porosity groups can be crucial to the overall evaluation of the structure. Pores can be detected within a metal structure using radiographic testing (RT) identification processes that involve performing RT imaging. RT imaging of a metal product involves taking a series of RT images of small sections of the product. In the case of a large structure, inspection of the article can involve the acquisition of hundreds of RT images. It can be a nearly human-intractable problem to identify every pore in an RT image. For an evaluation of a complete course of RT images corresponding to a manufactured article, a large number of pores must be identified, individually measured, and then linked together into clusters for analysis. This can be prohibitive. Additionally, the propensity for human error can become greater as the number of pores and the number of images increases. Several embodiments of the invention alleviate these issues by using an automated porosity detection model that is trained to generate a pore map that identifies pores and their measurements from an input RT image. Using a user interface (UI) the pore map can be annotated and/or updated by users. In several embodiments, the annotated and/or updated pore map can be used to retrain the machine learning model used to generate the original pore map.

Evaluating the quality of welds in aerospace structures can traditionally be accomplished through the stringent manual inspection of multiple modalities of data to determine the degree to which the weld has bonded to the base metal and if any contaminates or porosity is present. Several methodologies for evaluating the quality of a given weld exist, but many such methods assume that two faces are being joined with the weld. Therefore, most such methodologies are suited to traditional welding applications where a first section is welded to a second section along a line. In such a case, the area of weld is generally narrow, relatively long and is disposed between a first surface and a second surface where the first and second surface are surfaces on materials manufactured by conventional means. Additive manufacturing differs from welding in part because the deposited material is not a narrow seam between two conventionally manufactured parts; rather, the deposited material becomes the article of manufacture. Accordingly, the methodologies for manually evaluating weld quality fail to scale in additive manufacturing environments. When applying automatic RT identification processes to WAAM process outputs, porosity is evaluated when the area of weld makes up the entire article of manufacture.

Several embodiments described herein can include RT identification processes that are capable of automatic inspection of WAAM process outputs (e.g., manufactured articles). Described processes can identify defects (e.g., pores) in manufactured articles. Automatic processes can improve accuracy and/or reduce the number of technicians working on nondestructive evaluation (NDE). Identification results generated by various embodiments can be ISO standard compliant and can be fully qualified for an RT system.

The automated RT systems described herein can use machine learning models, such as (but not limited to) neural networks (NN), such as U-Net, to build an automated porosity detection model. The NN can be trained for segmentation of an RT image into identification of pore versus background. The location of pixels noted as pores can then be used to compute and measure pore clusters and/or determine rejected pore clusters. The output of the NN can be mapped into a user interface (UI). In some embodiments, a UI can be configured with ISO compliant viewer mechanisms linked to Architecture Design Record (ADR) tools. This can enable such UI features as rotating and flipping of images based on tags, zooming-in on pores, adjusting contrast to filter different types of pores, creating bounding boxes at angles around pores, and/or making annotations of pore maps that can be used to improve future prints and/or retrain the NN. In these ways, various embodiments of automated RT system can enable rapid inspection, evaluation, and/or iteration of printed parts to meet requirements (e.g., "AWS D20.1" discussed below, and/or other aerospace manufacturing weld standards).

In additive manufacturing production pipelines, the biggest time sink outside of the actual printing can often be legacy non-destructive evaluation (NDE). Legacy NDE can take around half as long as compared to actual printing. A large portion of time can involve manually inspecting radiographic testing (RT) images to detect and evaluate pores that have formed into clusters. Based on the topology of the cluster (e.g., distance measurements between pores, density, size, etc.), a determination as to whether an article should be rejected can be made.

Automated RT systems in numerous embodiments can use automated porosity decision making and/or pore measurement to generate a pore map and UI for further evaluation and/or inspection. The pore map can be displayed and/or interacted with via the UI. In several embodiments, automated RT systems can automatically calculate defects sufficient for rejecting a part. In some cases, defects can result in rejection when porosity clusters are sufficiently compromising such that the porosity clusters require repair or else the article will be unfit for purpose. Defects can be sufficient for rejecting an article when a set of quality metrics are not met for a WAAM generated part. In several embodiments, automated RT system can speed up a manual evaluation process. In some embodiments, automated RT system can automatically calculate rejects. For this disclosure, rejectable defects can be defined as those groups of porosity that exhibit size and spacing properties that would make them rejectable from use in a flight article based on a set of quality metrics (e.g., evaluation or acceptance criteria).

A user interface of an automated RT machine showing an RT image with porosity defects highlighted is illustrated in FIG. 1. A bounding box 102 indicates a region 104 with several porosity defects 106. The region 104 is an example of a rejectable defect.

Porosity data with spatial information in 3D can be critical for advanced applications of additive manufacturing, such as (but not limited to) WAAM. Automated RT system UIs can enable storable annotations that can be stored and/or linked to other print process data. Other print process data can include data such as (but not limited to) robot position at the time the defect was created, the voltage applied to and/or by one or more components (e.g., torch, motor), and/or any other process data. Automated RT systems in accordance with some embodiments of the invention can provide around a 50% time savings over the course of NDE.

In additional embodiments of the invention, a pore map can be used to project identified defects back onto the physical article itself.

Automated RT Systems

As noted in the previous section, evaluating the quality of welds in aerospace structures has traditionally been accomplished through the stringent manual inspection of multiple modalities of data to determine the degree to which the weld has bonded to the base metal and if any contaminants and/or porosity are present. Again, several traditional methodologies for evaluating the quality of a given weld exist; however, many assume that two faces (e.g., two faces of traditionally manufactured metals) are being joined with the weld. In contrast, in the context of Wire Arc Additive Manufacturing (WAAM), the entire structure consists of a collection of weld beads deposited on top of each other. This presents important differences for porosity evaluation between WAAM generated articles and conventional welds. The welds generated in WAAM process are disposed on one surface. This is in contrast to conventional welding where welds are disposed between at least two surfaces. Additionally, articles generated with WAAM processes can often require inspection of the entire article since the entire article can have porosity formed during the welding process. In contrast, articles generated using traditional welding typically require inspection of only the weld bead disposed between the weld-coupled traditionally manufactured portions and do not require inspection of the traditionally manufactured portions. As noted above, RT is a basic technique for identifying weld quality. RT also can be used for the evaluation of large, thin-walled structures such as the structures formed during additive manufacturing of large-scale structures including (but not limited to) rockets. But it is time consuming and significantly slows the additive manufacturing process due to the need to halt the WAAM process to inspect the article. The WAAM process may not continue until completing inspection and evaluation.

When evaluating an aerostructure manufactured through a WAAM process, the amount of area to be covered in inspection and Non-Destructive Evaluation (NDE) is vastly greater than that in a traditionally manufactured structure. Further, because of the volume of deposited material and the propensity for common weld defects to appear, the strategies for effective evaluation are different as compared to traditional inspection. A process can obtain a set of quality metrics (e.g., evaluation or acceptance criteria) to determine the allowable thresholds for common defects such as porosity. Determinations of spacing, size, and/or frequency between various defects can be compared to determine when a structure or section of a structure is rejectable. In various embodiments, automated RT systems can determine if a critical defect is detected based on spacing, size, and/or frequency between various defects. A critical defect can refer to a defect that requires repair and/or renders the manufactured article unfit for its purpose.

Traditional manual inspection can require NDE inspectors to acquire an RT image, load the image into a viewer, and/or manually measure the size and spacing of defects to determine if the section of the article in the image is compliant with obtained quality metrics. This manual evaluation process can be tedious, can require skilled evaluators capable of evaluation of RT images specifically in the context of the WAAM print process, and can be extremely time consuming. Commercially available RT viewers are not built to perform such evaluations automatically.

To overcome the limitations of legacy manual systems, many embodiments of the invention can utilize an automated RT system. Automated RT systems can alleviate many of the challenges associated with evaluating WAAM produced structures (e.g., aerostructures). In several embodiments, automated RT systems can combine automated defect recognition for porosity with an automated workflow for determining when pore clusters are not compliant with quality metrics. In certain embodiments, the automated RT system combines segmentation analysis with other processes in order to analyze large scale WAAM printed objects. Automated RT systems in accordance with a number of embodiments of the invention include a user interface (UI) that allows users to check the output of the defect detection models and/or dynamically interact with the evaluation of defects. In this disclosure, automated can refer to systems and/or process that are largely operated, performed, and/or effected by machines with limited human involvement required.

Figure 2:
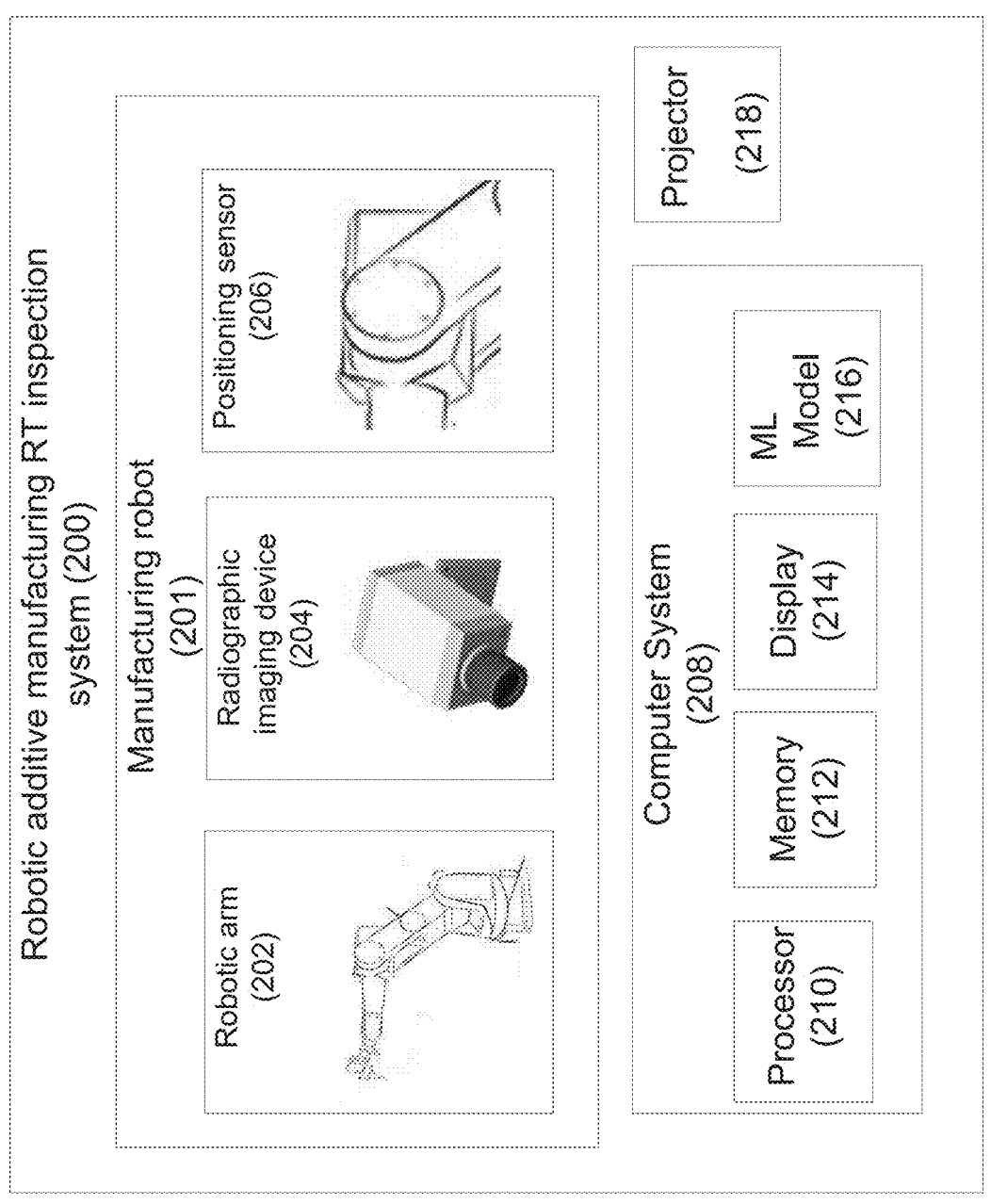
FIG. 2 conceptually illustrates a robotic additive manufacturing inspection system capable of identifying porosity defects in manufactured articles in accordance with embodiments of the invention.

FIG. 2 conceptually illustrates a robotic additive manufacturing inspection system, or automated RT system, capable of identifying porosity defects in manufactured articles. A robotic additive manufacturing inspection system 200 can be capable of identifying porosity defects in manufactured articles. A manufacturing robot 201 can include a robotic arm 202, an RT imaging device 204 and a positioning sensor 206. The RT imaging device 204 and/or the positioning sensor 206 can be mounted to the robotic arm 202. In several embodiments the manufacturing robot can be a robot configured for WAAM. The RT imaging system can be capable of generating RT images in accordance with embodiments of the invention. The system 200 can further include a computer system 208. The computer system can include a processor 210, memory 212, a display 214, and a machine learning model 216. The system 200 can also include a laser or light projector that can project defects identified in a pore map back onto the physical article.

In accordance with many embodiments, training can be performed on a cloud server. In several embodiments, a computer system can receive a new model from a server (e.g., from the cloud). In this way, several embodiments can perform model updates on the cloud and push model updates to local computer systems. An application and/or machine learning model parameter can be stored in the memory. In accordance with embodiments of the invention, the application can configure the processor to perform any (e.g., at least one, and/or all) of the processes described throughout this specification, including those processes for enabling the automated detection of pores and/or defects; machine learning models; pore map generation; porosity detection; and other processes. In many embodiments, all inference and model handling is performed on the cloud, and/or local computer systems can make use of outputs provided from the cloud.

Forming Reference Features in Products Formed Using Additive Manufacturing

In several embodiments, identification of a rejected region can be based on quality metrics (e.g., evaluation or acceptance criteria). Automatic identification of rejected regions can be based on applying quality metrics to pore maps. Identified rejected regions can be highlighted, displayed to users, and/or logged.

In several embodiments, identification of rejected regions involves mapping pixels in an RT image to distances. Pixels in an RT image can be matched to distances in one or more ways in accordance with several embodiments of the invention. In several embodiments, a reference feature that can be recognized using computer vision (e.g., markers, fiducials, and/or fiducial markings) can be formed in or added to WAAM printed objects. Including reference features can allow machine vision processes to determine real distances between features detected from pixels in RT images. In a number of embodiments, one or more reference features can be detected in an RT image and the geometry of the one or more reference features used to determine the distance between pixels in the RT image. For example, the reference features can be used to translate a distance measured in pixels to a distance measured in millimeters or mils (i.e. thousands of an inch). As can readily be appreciated, the specific manner in which distances measured in pixels can be translated to real world distance measurements is largely dependent upon the nature of the reference features formed in the additively (e.g. WAAMS) manufactured product. In several embodiments, reference features can be used for collecting/generating data for ML training. In several embodiments reference features formed in printed articles can be used to make data for ML training consistent.

While reference features that are formed during an additive manufacturing process are described above for the purpose of determining the real-world distances that correspond to distances between features in an RT image, reference features can also be fixed to a product after its manufacture and prior to RT imaging. In several embodiments, reference markers are affixed to a product prior to RT imaging. Reference markers can, in many embodiments, be made with stainless steel. The markers can be identified by various processes to map pixels to real distances. Processes can have data denoting the characteristics of reference features.

In several embodiments, pixels in RT images can be mapped to real distances based on a built-in ruler and/or calibration tool. Built-in rulers and/or calibration tools can be ISO standards compliant in some embodiments. Users can, in many processes, make measurements to one or more specific reference points, and can then calibrate manually as well. The calibration can be provided to an ML system such that training and/or analysis can be based on data with consistent real-world distances in accordance with many embodiments of the invention.

In accordance with certain embodiments of the invention, the location, configuration, and/or orientation of one or more robots positioning X-ray imaging equipment can be recorded. Location, configuration and/or orientation (e.g., localization data) of the robot can be used to determine where an RT image is oriented relative to the part. Based on localization data it can be possible to generate point clouds and/or re-project defects back onto the physical object itself. Pores and/or other defects can be localized with respect to the real manufactured article. Localizing pores and/or other defects onto a manufactured article can rely on ray tracing codes, RT images, projection, and/or linking reference features. Based on these, pores and/or other defects can be mapped onto the manufactured article.

Automated Defect Detection Using Machine Learning Models

Figure 3:
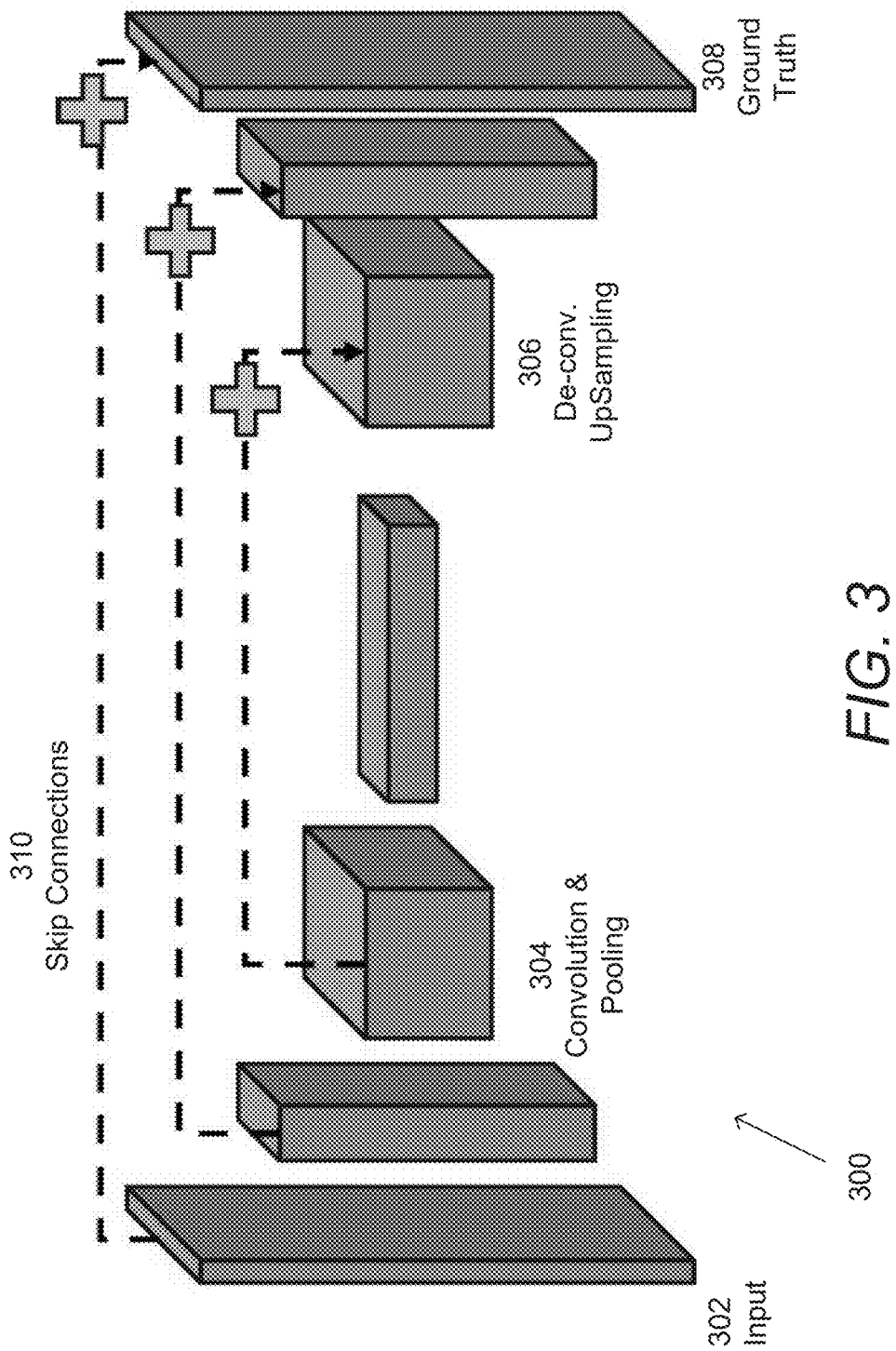
FIG. 3 conceptually illustrates an example convolution U-Net model in accordance with embodiments of the invention.

A U-Net model that can be utilized to perform pore classification in accordance with an embodiment of the invention is conceptually illustrated in FIG. 3. The convolutional neural network 300 can be used to classify pixels as pores or as background (e.g., not pore). A convolutional model 300 can receive an input image 302. The input image can be an RT image patch. The pixels of the input image can be subjected to convolution and pooling 304. Deconvolution and up-sampling 306 can be used after convolution and pooling. The output of the model can be a map showing pixels labelled as pore and not-pore. When the model is being trained, the output of the model can be compared to ground truth 308 so as to refine the model. Skip connections 310 can be included for concatenation of equivalently sized layers.

Although a specific configuration of neural network is described above, one skilled in the art will recognize that any of a variety of machine learning models may be utilized in accordance with embodiments of the invention.

Processes for Pore Detection and Generating a Pore Map

Figure 4:
FIG. 4 illustrates a process for performing automated RT analysis to generate a pore map in accordance with embodiments of the invention.

In accordance with many embodiments of the invention, a porosity detector can perform automated porosity detection. A process for performing automated porosity detection in accordance with an embodiment of the invention is conceptually illustrated in FIG. 4. The process 400 includes receiving (402) an input image. The input image can be (but is not limited to) an RT image and/or an image patch obtained from an RT image. As discussed further below, certain embodiments may perform classification on an image patch that is a portion, not the entirety, of an RT image. The portioning may be in the interest of computational efficiency (e.g., memory resources, processing time, etc.) when an RT image is at a very high resolution/size.

The brightness and/or contrast of the input image or image patch can be adjusted such that the segmentation algorithm can be more effective. In some embodiments of the invention, pixel brightness values of the input image are modified so that the histogram matches the histogram of a reference image. Certain levels of pixel brightness can be mapped to each other so that the range and histogram of values in the input image becomes closer to that of the reference image.

The pixels within the input image can be classified (404) by a machine learning model, such as (but not limited to) the U-Net model, to produce a pixel-wise segmentation map. A machine learning model can have a deep segmentation algorithm developed on top of a U-Net architecture. Machine learning models can be pore classification models. In many embodiments, machine learning models can be trained for a binary segmentation task where every pixel in an image (e.g., an RT image, and/or an image patch obtained from an RT image) is labeled as either pore or background. Segmentation, in some embodiments, can be performed by a U-Net model and/or Hessian analysis. In accordance with several embodiments of the invention, porosity detection can be performed using convolution. In many embodiments, a marching squares algorithm can be used for post-processing on the resulting segmentation map.

This pixel-wise segmentation map can then be run through a cluster-detector that bounds each significant collection of pore-labeled pixels. In several embodiments, porosity detection can include using reference features to map pixels to real-world distances (as described elsewhere herein). In a number of embodiments, porosity detection (406) can be used to identify regions of the input image with porosity based the output from the pixel classification, i.e., pixels identified as pore or not pore (background). As can readily be appreciated, any of a variety of blob, cluster, and/or other structural detection process can be utilized as appropriate to the requirements of specific application. In accordance with various embodiments of the invention, porosity detection can be cluster detection. Detection can involve identifying pores, measuring the individual pores, and linking the pores together into clusters. In several embodiments, measurement may utilize reference features (e.g., markers, fiducials, and/or fiducial markings) as discussed further above. Porosity detection can also include blob detection that bounds each significant collection of pore-labeled pixels. The porosity detection can determine a center point and radius of each detected pore.

Pore detection may be designed to filter out artifacts of the segmentation algorithm. Parameters that can be considered include convexity, circularity, and minimum size of a group of pixels to determine if it is identified as a pore. Using geometric calculations, the process may look for groups of pixels with a shape that is spherical, roughly convex, having no divots, and being a minimum size (in pixels or measurement). For example, a minimum size parameter may be set to three pixels, or a number between 2 and 5.

To capture different scenarios, pore detection may include one or multiple filters, each of which includes one or more parameters (e.g., convexity, circularity, minimum size, etc.). For example, a filter may be designed for very large pores (e.g., more than 10 pixels) and require high circularity since it would be expected to be very circular at a larger size. A filter designed for smaller pores (e.g., less than 10 pixels) may have a different requirement for circularity. The filters may be run in redundancy or in different logical combinations (e.g., and, or, etc.).

Based on the output of porosity detection, a pore map can be generated (408) that includes the center points and radii of detected pores. The pore map can be generated based on one or more received (402) RT images. In several embodiments, pore maps can be overlaid on the input image (or an image from which the input image was derived) and displayed via a UI. In several embodiments, user(s) can provide annotations via the UI. In certain embodiments, the annotations can be associated with one or more regions on the pore map. In a number of embodiments, pore maps including user provided annotations can be used for training machine learning models including (but not limited to) the U-Net models described above.

Pore maps can note the center point and/or radius of one or more pores detected in an image. The pore maps can be generated based on a sliding-window approach (e.g., as described elsewhere herein) such that a large image can be analyzed piecewise. Pore maps can be stored in databases and/or pushed to other software tools. In accordance with several embodiments of the invention, pore maps can be displayed to a user (e.g., through a UI). Users can make annotations on the pore maps. Centers and diameters of pores in pore maps can be used to automatically compute pore clusters and/or to identify rejectable defects.

Although a specific process is described above, one skilled in the art will recognize that any of a variety of processes may be utilized in accordance with embodiments of the invention.

Sliding Window in Pore Detection

RT images from WAAM can often be too big for traditional analysis methods, for example WAAM RT images can be around 3072×3072 pixels.

Traditional analysis methods are typically most suitable for analyzing smaller images (e.g., image scale of about 500×500 pixels). However, applying traditional methods in large image analysis can encounter stability issues and training can be an issue as well. To overcome these problems, segmentation in accordance with embodiments of the invention can include using a patch-wise sliding window approach.

A patch-wise sliding window approach can select regions (e.g., patches) of an RT image. The patch-wise sliding window approach can be characterized by window size, a stride length, and/or an overlap amount. The window size can refer to the size of each patch. A stride length can refer to a change in position of the source of a patch between each patch. An overlap amount can correspond to an amount of overlap in an X and/or Y direction for adjacent patches. Each patch can be provided individually to a machine learning model. The machine learning model can perform a classification on each pixel within the patch, identifying each pixel as corresponding to pore or as not corresponding to a pore. The machine learning model can process the patches individually. Processing the patches can include identifying pores in the RT images. The information concerning the identified pores can be aggregated into a single pore map.

Overlapping the patches can be beneficial to account for edge effects. A pixel in an overlapping area of multiple patches may be cumulatively identified (taken as the final identification) as pore when it is identified pore in all of the individual patches. Similarly, a pixel may be cumulatively identified as not pore when it is identified as not pore in all of the individual patches. Any of a number of approaches may be utilized in accordance with embodiments of the invention to resolve a cumulative identification when there is a conflict and the identification is not the same across all patches that include the overlapping area. For example, a rule may be to take the majority of identifications across the patches as the cumulative identification. Alternatively, a conflict may be resolved as identifying the pixel as not pore. Still another rule can be to take the highest confidence value output by the segmentation algorithm of the patches. One skilled in the art will recognize that similar rules individually or in combination may be utilized to resolve conflicts in identification of pixels in overlapping areas in accordance with embodiments of the invention as appropriate to a particular application.

Patch size can be controlled in segmentation. An appropriate patch size can be found to improve identification of pores when pore size is very small relative to the overall image. In WAAM RT images it is common that a ratio between pore size and RT image size can be very large, which can result in segmentation overfitting pixels to background. To make identification of pores effective under such a condition, in many embodiments of the invention the patch size can be made small enough to boost the ratio between expected average pore size and the RT image patch size. On the other hand, if the patch size is too small, the model may lose context from the surrounding image. A preferred patch size can be used for patch-wise sliding window analysis as in processes such as those described further below. In several embodiments the preferred patch size is 224×224 pixels. Other embodiments may utilize a different patch size. The preferred patch size can be based on expected characteristics of the porosity defects (which may vary by WAAM process parameters, and/or materials used) and/or the resolution of expected RT images. Tuning a model for pore detection according to a particular patch size, WAAM process parameters, and/or WAAM material (e.g., aluminum) can improve performance. Subsequently, when patch size is modified, the model constructed during the training process may have reduced accuracy. This can be because the size of the features versus the patches can vary according to patch size. In several embodiments, training data for pore detecting models includes RT images with a patch size equal to the patch size of RT images for which the models are used to analyze. Hence a model can identify and/or categorize defects. A model can be trained for a particular patch size, particular WAAM parameters, particular material selections, and/or particular expectations about pores in a WAAM generated article.

Processes for Active Learning of a Pore Detection Model

In several embodiments, segmentation can be coupled with an active learning pipeline. An active learning pipeline can include a UI that allows annotations from users. Users can annotate and/or label data. Annotations and/or labels can include adjustments to contrast/brightness, adjustments to zoom, identification of blotches/defects, use of rulers to measure distances between features within an image, text, and/or other indicators. These annotations can be collected as training data for a training process that retrains an underlying machine learning model using the newly acquired training data. The training process can be an online process whereby a machine learning model can be updated based on the annotations and/or labels. In accordance with various embodiments of the invention, synthetic training data can be generated as part of the training process.

Figure 5:
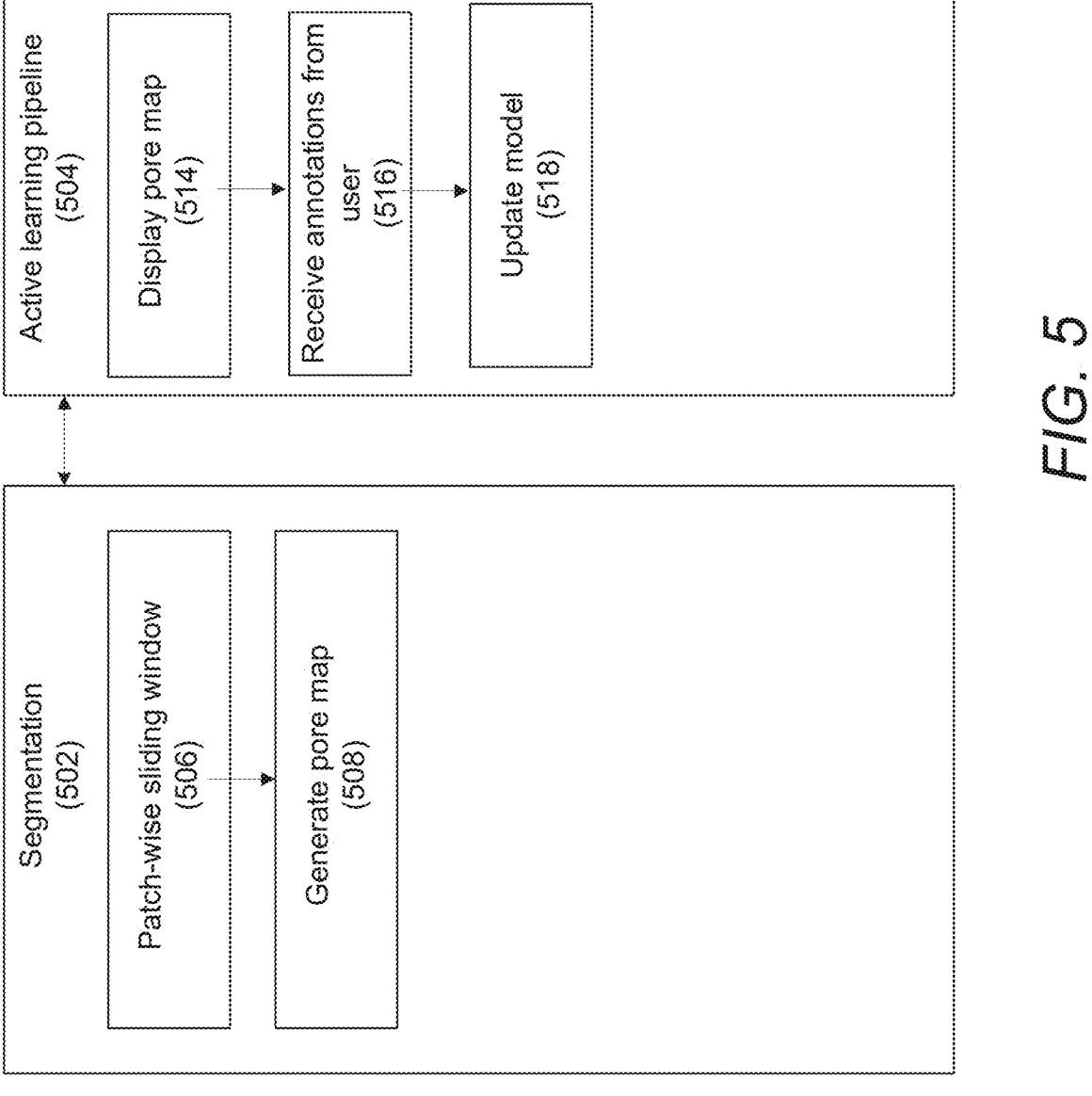
FIG. 5 illustrates a process for performing automated porosity detection and using active learning to improve detection models in accordance with embodiments of the invention.

An example process for performing automated RT analysis is conceptually illustrated in FIG. 5. The process 500 includes performing (502) segmentation. In a number of embodiments, segmentation (502) is performed in parallel to an active learning pipeline (504). Segmentation (502) can be performed on an RT image to identify pores. In a number of embodiments, segmentation is performed using a machine learning model, such as (but not limited to) a U-Net model described with respect to FIG. 3 above in a process such as the process described with respect to FIG. 4 above. Segmentation can include using (506) a patch-wise sliding window approach to identify pores in the image. As discussed further above, the use of a sliding window to obtain patches can be more computationally efficient. Each patch identified using the sliding window approach can be provided as an input to the machine learning (e.g., U-Net) model. The machine learning model can generate an output identifying pores. Based on the pores identified in each of the patches, the process can generate (508) a pore map.

A user can annotate the displayed pore maps and provide updates, corrections, and/or notes. In several embodiments, the active learning pipeline (304) can include displaying (514) a pore map. One or more users can interact with the pore map. The active learning pipeline 504 can receive (516) annotations from the user including (but not limited to) annotations regarding pore locations and/or regions that constitute a rejected region. The machine learning model underlying the process 500 can then be updated (518) based on the annotations received from the user.

Although a specific process is described above, one skilled in the art will recognize that any of a variety of processes may be utilized in accordance with embodiments of the invention.

In several embodiments, UIs can provide RT image viewing capabilities. Users can interact with porosity detection processes. Users can apply evaluation or acceptance criteria to an image, and/or monitor macro-level trends in an RT image. In some embodiments, different criteria may be assigned to different regions of an image, which can accommodate when two wall thicknesses or two feature types appear in the same image. Example macro-level trends include porosity size distribution, pore density, pore groupings, typical contrast and brightness settings when defects are selection, algorithms used in evaluation, false positive rates, and/or false negative rates. Furthermore, porosity detection processes can be rerun with different parameters to identify how total numbers of rejects change as parameters are changed. Furthermore, various defect types can be manually marked and persisted (e.g., stored in a database) for training models capable of identifying various defect types.

Processes for Identifying Rejected Regions from a Pore Map

In several embodiments, automated RT systems can automatically calculate defects sufficient for rejecting a part. In some cases, defects can result in rejection when porosity clusters are sufficiently compromising such that the porosity clusters require repair or else the article will be unfit for purpose. Defects can be sufficient for rejecting an article when a set of quality metrics are not met for a WAAM generated part. In several embodiments, automated RT system can speed up a manual evaluation process. In some embodiments, automated RT system can automatically calculate rejections using a set of quality metrics based on a specification that states allowable sizes of defects (e.g. cracks, porosity, slag, etc.) that result in rejection of a part if the stated allowable size is exceeded. Acceptance criteria are typically defined with regard to manufacturing process (e.g. welding, forming, casting) and alloy type, though they may be as broad or specific as is applicable to the industry and manufactured article of interest. American Welding Society (AWS) D20.1/D20.1M Specification for Fabrication of Metal Components using Additive Manufacturing" (AWS D20.1) serves as an example of acceptance criteria for additively manufactured components. However, any of a variety of specifications that provides evaluation or acceptance criteria for defects may be utilized in accordance with embodiments of the invention as appropriate to a particular application.

A process can obtain a set of quality metrics to determine the allowable thresholds for common defects such as porosity. Determinations of spacing, size, and frequency between various defects can be compared to determine when a structure or section of a structure is rejectable. In various embodiments, automated RT systems can determine if a critical defect is detected based on spacing, size, and/or frequency between various defects. A critical defect can refer to a defect that requires repair and/or renders the manufactured article unfit for its purpose.

Figure 6:
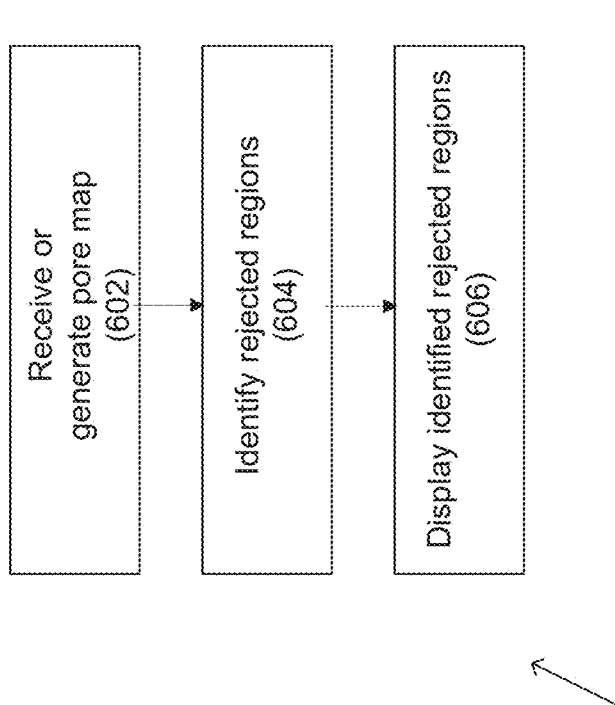
FIG. 6 illustrates a process for identifying rejectable defects from pore maps in accordance with embodiments of the invention.

A process for identifying rejectables using a pore map of an article in accordance with embodiments of the invention is illustrated in FIG. 6. A pore map is received or is generated (602), such as by the processes described further above. Based on the pore map, the process can identify (604) rejected regions using a set of quality metrics as criteria as discussed above. The process 600 can also display (606) on a UI the locations of the pores and/or other information including (but not limited to) information identifying a rejected region(s) and/or information identifying other regions of interest to a user. In some embodiments, the UI can capture annotations by a user as discussed with respect to FIG. 5 further above.

Although a specific process is described above, one skilled in the art will recognize that any of a variety of processes may be utilized in accordance with embodiments of the invention.

Projecting Pore Map

In additional embodiments of the invention, a pore map can be used to project identified defects (e.g., pores) back onto the physical article by any of a number of techniques. Projection onto the physical article itself may utilize localization information (robot orientation, etc.) as discussed further above.

One option is to use a laser system (e.g., Faro Tracer M or Virtek Iris 3D) to project defects onto the article. Pore data within a pore map provides size and placement information of pores in pixel space. To move from pixel space to 3D, the position and size of the detector plate can be used to map every pixel to a location on the detector plate.

Yet another option is to import the pore data into a finite element modeling (FEM) model. Rather than predetermine criteria for quality based on structural performance, this method can insert any defects found into models to directly compute the structural performance degradation. This way can potentially pass through inspection some articles that are defected yet not degraded by improving tolerances for porosity and other defects.

While specific architectures, assemblies, components and/or systems for robotic additive manufacturing are described above, any of a variety of assemblies, components and/or systems can be utilized for robotic additive manufacturing as appropriate to the requirements of specific applications. Notably, all references to wire arc additive manufacturing in this application are provided as an example and should not be construed as limiting. The inventive concepts in this application are applicable to any Directed Energy Deposition (DED) 3D printing process that uses wire feedstock. Relevant energy sources are plasma, arc, laser, and others. In certain embodiments, steps and/or components may be performed and/or configured in any order, sequence, and/or configuration not limited to the order, sequence and/or configuration shown and described. In a number of embodiments, some of the above steps may be executed or performed substantially simultaneously where appropriate or in parallel to reduce latency and processing times. In some embodiments, one or more of the above steps and/or components can be rearranged or omitted. Although the above embodiments of the invention are sometimes described in reference to robotic additive manufacturing, the techniques disclosed herein may be used in any type of robotics control system. The techniques disclosed herein may be used with any of the additive manufacturing assemblies, components, systems, methods and/or processes as described herein.

What is claimed is:

1. A robotic additive manufacturing inspection system configured to identify porosity defects in manufactured articles, the robotic additive manufacturing inspection system comprising:

an additive manufacturing robot, the additive manufacturing robot comprising:

a robotic arm;

a radiographic testing (RT) imaging system mounted to the robotic arm; and at least one sensor capable of determining a position of the robotic arm;

an image processing system, the image processing system configured to:

obtain a RT image from the RT imaging system of an article created by additive manufacturing and localization information including the position of the robotic arm when the RT image was captured;

adjust brightness values of pixels within the RT image to normalize the brightness values against brightness values in a reference image;

identify a plurality of image portions within the RT image, wherein each image portion at least partially overlaps at least one other image portion;

classify each pixel in each image portion using a pore classification binary segmentation model as "pore" or "not pore" to obtain classification of the pixels in the image portions;

generate a pore map based on applying one or more porosity detection clustering filters to the classification of the pixels in the image portions, where the pore map includes identification of pores within the image portions and measurements of the pores based on a measurement calibration of the RT imaging system; and determine whether to identify at least one area within the RT image as a rejected region based upon the pore map, when the at least one area exceeds a rejection threshold based on a set of predetermined criteria.

2. The robotic additive manufacturing inspection system of claim 1, where the image processing system is further configured to:

display the pore map with the rejected regions visually identified;

receive an annotation from a user, wherein the annotation is characterized by at least a location on the pore map; and update the pore classification binary segmentation model based on the received annotation.

3. The robotic additive manufacturing inspection system of claim 2, wherein the annotation comprises at least one transformation selected from a list of adjustments to contrast/brightness, zoom in, circling out of blotches, circling out of defects, use of rulers to measure distances, text notations, and pore classifications.

4. The robotic additive manufacturing inspection system of claim 1, wherein adjusting the brightness values of pixels within the RT image to normalize the brightness values against the brightness values in a reference image comprises setting the brightness values so that a histogram of the RT image approximately matches a histogram of the reference image.

5. The robotic additive manufacturing inspection system of claim 1, wherein applying porosity detection clustering filters evaluates characteristics of each pore in the pore map including convexity, circularity, and a minimum size.

6. The robotic additive manufacturing inspection system of claim 1, wherein applying the porosity detection clustering filters provides a center point and radius of each detected pore in the pore map.

7. The robotic additive manufacturing inspection system of claim 1, wherein the rejection threshold based on a set of predetermined criteria includes spacing, size, and frequency between defects in the pore map.

8. The robotic additive manufacturing inspection system of claim 1, wherein generate a pore map further comprises:

resolving classification of a pixel as "pore" or "not pore" that differs in image portions where the pixel is included in overlapping areas by taking the identification having the highest confidence value output by the pore classification binary segmentation model.

9. The robotic additive manufacturing inspection system of claim 1, wherein the article comprises a reference feature and the image processing system is further configured to obtain the measurement calibration of the RT imaging system based on the reference feature.

10. The robotic additive manufacturing inspection system of claim 1, wherein one or more porosity detection clustering filters includes a plurality of porosity detection clustering filters, and each porosity detection clustering filter includes a different combination of values for parameters of convexity, circularity, and minimum size.

\* \* \* \* \*